July 20, 1965 E. M. SCHMIDT 3,196,336
BIDIRECTIONAL POWER SUPPLY SYSTEM
Filed June 9, 1961
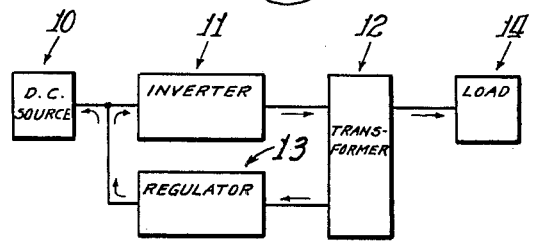
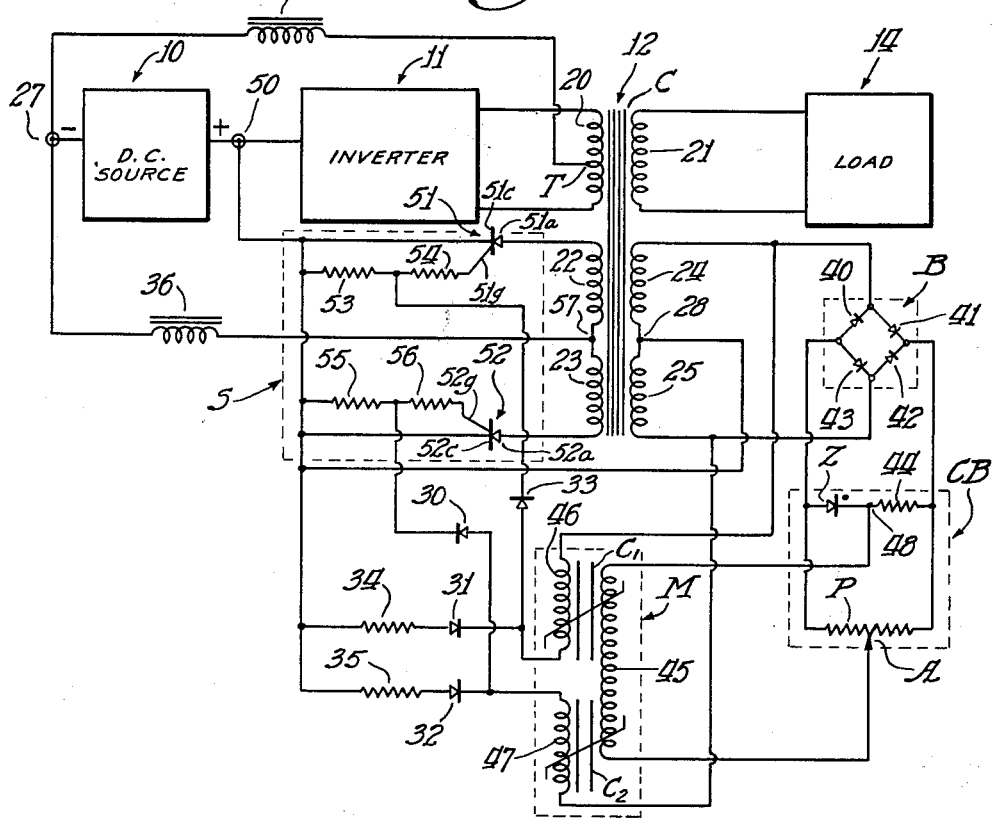
Inventor:
Edward M. Schmidt
By: Ray E. Snyder
Atty.

United States Patent Office 3,196,336
Patented July 20, 1965

3,196,336
BIDIRECTIONAL POWER SUPPLY SYSTEM
Edward M. Schmidt, Evanston, Ill., assignor to Borg-Warner Corporation, Chicago, Ill., a corporation of Illinois
Filed June 9, 1961, Ser. No. 115,959
7 Claims. (Cl. 321—18)

This invention relates to a voltage regulator circuit particularly adapted to be used with a direct-current (D.C.) power source and a static inverter.

In applications requiring the supply of alternating current (A.C.) power from a D.C. source, where both the load and source voltage can vary, it is often necessary to regulate the A.C. output voltage to within tolerable limits. Ordinarily, efficient regulation can be obtained only with large and heavy or bulky components. The design of a voltage regulator for any particular application, therefore, involves a compromise between the weight and bulk that can be tolerated and the efficiency desired.

It is an object of the present invention to provide an improved voltage regulator circuit that is of compact construction, light weight, impervious to normal shock and environmental conditions and has a high degree of efficiency.

It is an additional object to provide an improved voltage regulator circuit having a fast response time for changes in load, which has no moving parts and has an extremely long and useful life.

It is also an object to provide a voltage regulator that can efficiently accommodate large changes in load power factor.

It is still another object to provide an improved voltage regulator system that is reversible in operation, in that, when the load is generating energy, this energy is returned to and stored by the source of D.C. power.

It is another object to provide a static inverter energizable from a D.C. source and a voltage regulator circuit that is operable to supply A.C. power to a load and at times is effective to return to the source A.C. energy not used by the load. The regulator converts the returned A.C. energy into D.C. energy which is stored at the D.C. source.

The invention consists of the novel constructions, arrangements, and devices to be hereinafter described and claimed for carrying out the above-stated objects and such other objects as will appear from the following description of a preferred form of the invention, illustrated with reference to the accompanying drawings, wherein:

FIGURE 1 is a block diagram of the components of the present invention, including a transformer and a synchronous voltage regulator; and FIGURE 2 is a schematic diagram of the transformer and voltage regulator of FIGURE 1.

Like characters of reference designate like parts in the several views.

Referring to FIGURE 1, the system illustrated comprises a D.C. source 10, an inverter circuit 11, a transformer 12, a synchronous voltage regulator circuit 13, and a load 14. The D.C. source 10 is connected to supply D.C. energy to the inverter circuit 11. The inverter 11 converts the D.C. energy into A.C. energy and supplies the latter to the transformer 12. The transformer 12, in turn, supplies A.C. energy to the load 14. The regulator 13 is connected to the transformer 12 and for certain operating conditions is effective to receive A.C. energy from the transformer 12, convert this energy into D.C. energy and return it to the D.C. source 10.

Referring to FIGURE 2, the transformer 12 and voltage regulator 13 are illustrated in schematic form in combination with the D.C. source 10, inverter 11 and load 14 which are shown in block form. The transformer 12 comprises a core C, a center tapped input winding 20, an output winding 21, regulator input windings 22 and 23, and voltage sensing windings 24 and 25. The center tap T of the input winding 20 is connected through a shaping coil 26 to a negative terminal 27 of the D.C. source 10.

The voltage regulator circuit 13 comprises a bridge circuit B, a control bridge circuit CB, a magnetic amplifier M, and a synchronous rectifier S. The regulator circuit 13 also comprises diodes 30, 31 32 and 33, resistors 34 and 35, and a filter coil 36.

The bridge circuit B comprises four silicon diodes 40, 41, 42 and 43. The input terminals of the bridge B are connected to the sensing windings 24 and 25, and the output terminals are connected to the control bridge CB. The bridge circuit B is conventional in function and structure and will not be described further. The control bridge CB comprises a potentiometer P, a Zener diode Z and a resistor 44. The magnetic amplifier M comprises a control winding 45 and output windings 46 and 47. The Zener diode and resistor 44 of the control bridge CB are connected in series to the output terminals of the bridge circuit B. The potentiometer P is connected in parallel with the series combination of Zener diode Z and resistor 44. A movable arm A of the potentiometer P is connected to one end of the control winding 45 of magnetic amplifier M, and the other end of the control winding 45 is connected to a junction 48 between the Zener diode Z and the resistor 44.

The output coil 46 of magnetic amplifier M has one end connected to the sensing winding 24 of the transformer 12, and the other end is connected to the cathode of diode 31 and to the anode of diode 33. The output coil 47 of the magnetic amplifier M has one end connected to the output winding 25 of the transformer 12, and the other end is connected to the anode of diode 30 and to the cathode of diode 32. The anode of diode 31 is connected through resistor 34 to a positive terminal 50 of the D.C. source 10, and the anode of diode 32 is also connected through resistor 35 to the positive terminal 50.

The synchronous rectifier circuit S comprises controlled rectifier-type transistors 51 and 52, and resistors 53, 54, 55, and 56. The synchronous rectifier circuit S also includes the input windings 22 and 23 of the transformer 12. In the present embodiment, the voltage regulator circuit 13 is shown as utilizing two controlled rectifier-type transistors 51 and 52, but it is contemplated that other suitable controlled current conducting means can be substituted therefor.

The windings 22 and 23 are connected in series, and a junction 57 between the windings is connected through the filter coil 36 to the negative terminal 27 of the D.C. source 10. The winding 22 is also connected to the anode 51a of the rectifier 51. The winding 23 is also connected to the anode 52a of the rectifier 52. The cathodes 51c and 52c of rectifiers 51 and 52, respectively, are connected to the positive terminal 50 of the D.C. source 10. A gate 51g of the rectifier 51 is connected through resistor 54 to one end of the resistor 53 and to the cathode of diode 33. A gate 52g of rectifier 52 is connected through resistor 56 to one end of the resistor 55 and to the cathode of diode 30. The other ends of the resistors 53 and 55 are connected to the positive terminal 50 of the D.C. source 10.

In operation, the system described functions as follows: D. C. energy from the source 10 is supplied to the inverter 11. The inverter 11 converts the D.C. energy into A.C. energy which is applied to the winding 20 of the transformer 12. An A.C. voltage is induced in the output winding 21 which is supplied to the load 14. Voltages are simultaneously induced in the windings 22–25. The load 14 absorbs energy from the transformer 12 and this absorption has an effect on the voltages induced in the windings 22–25. The windings 22 and 23 also absorb energy from the transformer 12 and this energy is converted or rectified into D.C. voltage and returned to the source 10. The amount of energy returned is controlled by the magnetic amplifier M which, in turn, is controlled by the bridge circuits CB and B. The windings 24 and 25 detect variations in load conditions by sensing a fluctuation in voltage developed in the transformer 12. The voltages induced in the windings 24 and 25 are applied across the bridge circuit B where it is rectified and applied to the control bridge CB. The rectified D.C. voltage across the control bridge CB is divided by the potentiometer P and applied to the control winding 45 of the magnetic amplifier M. Current flowing through the control winding 45 tends to control the time of flux saturation within the cores C1 and C2.

Voltages induced in the windings 24 and 25 are also applied to the windings 46 and 47 of the magnetic amplifier M. Current flowing through the windings 46 and 47 at any instant of time also tends to control the saturation of the cores C1 and C2. The amount of current flowing through either of the windings 46 or 47 at any instant of time depends upon the relative saturation of the cores C1 and C2, respectively. If either of the cores C1 or C2 is unsaturated, very little current will flow through the respective coil. When the cores are saturated, however, the current becomes substantially greater.

The voltage induced in the winding 24 causes current to flow through the winding 46, diode 33, and resistor 53 to the junction 28 between the windings 24 and 25. Current flowing through the resistor 53 develops a positive voltage across it and this voltage is applied through the resistor 54 to the gate 51g of the rectifier 51. The rectifier 51 is triggered into conduction and the voltage developed in the winding 22 causes the current to flow to the positive terminal 50 of the D.C. source 10. A return path for the current from the D.C. source 10 is provided from the negative terminal 27 through the coil 36 to the junction 57 between windings 22 and 23.

Similarly, voltage generated in the winding 25 causes current to flow through the winding 47, and the magnitude of this current is controlled by the saturation of core C2. When the core C2 is saturated the current becomes comparatively large and flows through the diode 30, resistor 55, back to the junction 28 of windings 24 and 25. Current flowing through the resistor 55 develops a positive voltage across it which is applied to the gate 52g of rectifier 52. This positive voltage triggers the rectifier 52 into conduction, and voltage generated within the winding 23 causes current to flow to the positive terminal 50 of the D.C. source 10. The energy supplied from the rectifiers 51 and 52 is a full-wave rectified D.C. voltage, and the magnitude is determined by the duration and rate of conduction of each of the rectifiers 51 and 52.

When the load is relatively heavy, the amount of energy returned to the source by the regulator circuit is relatively small, whereas when the load is light the voltage across the winding 21 tends to increase and the amount of energy returned to the D.C. source is relatively large.

It is to be understood that the invention is not to be limited to the specific constructions and arrangements shown and described, except only insofar as the claims may be so limited, as it will be understood to those skilled in the art that changes may be made without departing from the principles of the invention.

I claim:

1. For use with a system having an input circuit for energization from a D.C. source, a static inverter coupled to said input circuit for providing A.C. electrical energy, and a load for energization by the A.C. energy, the combination of a transformer with a plurality of windings, means including certain of said windings for coupling the inverter to the load, controlled current conducting means coupled to at one of said windings of said transformer and to said input circuit, saturable control means coupled to another of said windings and connected to control the conduction of said current conducting means, and rectifying means, coupled to at least one winding of said transformer and operative responsive to a voltage signal received thereover to regulate said saturable control means, whereby the operation of said saturable control means is controlled by said rectifying means for in turn controlling the conduction of a said current conducting means for returning an amount of D.C. energy to the input circuit that varies substantially directly as the output voltage of said transformer varies.

2. For use with an electrical power system which includes input terminals for receiving energy from a source of D.C. energy, a static inverter coupled to the input terminals for converting D.C. energy to A.C. energy, a transformer having first and second sets of windings, mean including said first set of windings for intercoupling the inverter with a load, the combination of controlled current conducting means coupled to one of said second set of windings and to said input terminals, a saturable reactor having output windings coupled to the other of said second set of windings and connected to control the conduction of said current conducting means, and having a control winding for establishing the level of saturation within said saturable reactor, and rectifying means coupled to said control winding and to said other of said second set of windings for providing a D.C. voltage to said control winding proportional to the A.C. voltage at said other winding of the second set of transformer windings, whereby the operation of said saturable reactor is controlled by changes in transformer output voltage for in turn controlling conduction of said current conducting means and thereby controlling the amount of D.C. energy returned to the input terminals.

3. In an electriacl circuit, the combination of an input circuit for intercoupling with a source of D.C. energy, an inverter coupled to said input circuit and operable to convert D.C. energy into A.C. energy, a transformer having an input winding coupled to said inverter and having a plurality of output windings, means for coupling one of said output windings to a load, a pair of controlled rectifier type transistors coupled to a second one of said output windings and to said input circuit, a magnetic amplifier, having a pair of output windings coupled to another output winding of said transformer and to said transistors for controlling the conduction thereof, and having a control winding for establishing the level of flux saturation within said magnetic amplifier, a control bridge circuit having an adjustable element coupled to said control winding, and a rectifier bridge circuit intercoupled with a reference output winding of said transformer and with said control bridge circuit for providing a rectified voltage to said control bridge circuit that is proportional to the A.C. voltage at said reference output winding, whereby the saturation of said magnetic amplifier is controlled by the voltage at an output winding of said transformer for controlling the conduction of said transistors and thereby determining the amount of D.C. energy returned to the input circuit.

4. A voltage regulator circuit for use with an electrical power system which includes an input circuit for connection to a source of D.C. energy, an inverter coupled to said input circuit for converting the D.C. energy into A.C. energy, a transformer having an input winding coupled to the inverter and a first output winding coupled to a load which at times may not absorb all the power passing through the transformer, the combination of a plurality of additional output windings and said first output winding linked through a common core to the input winding of the transformer, controlled current conducting means coupled to one of said additional output windings and to the input circuit, saturable control means coupled to another of said additional output windings of the transformer and connected to control the conduction of said controlled current conducting means, and rectifying means also coupled to one of said additional output windings and to said saturable control means for providing a rectified voltage proportional to the output voltage developed at said last-mentioned output winding for controlling the operation of said saturable means, whereby said controlled current conducting means, said saturable means and said rectifier means are operable to return D.C. energy to the input circuit when the load does not absorb all of the A.C. energy passing through the transformer.

5. For use with an energy delivery circuit including an input circuit for receiving D.C. energy from a suitable source, an inverter coupled to the input circuit for changing D.C. energy into A.C. energy, and a load circuit for receiving and dissipating A.C. energy, the improvement which comprises energy transfer means coupled between the inverter and the load circuit for transferring A.C. energy thereto, and an energy return circuit including controlled rectifier means coupled between the energy transfer means and the input circuit, operable in response to a decrease in the amount of A.C. energy transferred to the load to provide a related increase in the amount of D.C. energy returned to the input circuit, whereby the waste of energy as load requirements diminish is avoided.

6. For use with an energy translation circuit including input means for receiving D.C. energy from a unidirectional source, an inverter coupled to said input means for receiving D.C. energy and converting the same into A.C. energy, and a load circuit disposed for energization with A.C. energy, the improvement which comprises an energy return circuit including energy translation means having a first energy transfer circuit coupled between the inverter and the load circuit, and a second energy transfer circuit operable to provide a control signal of increasing level responsive to a decrease in the amount of A.C. energy absorbed by said load, controlled rectifier means, coupled between said second energy transfer circuit and said input means, for receiving A.C. energy from said second energy transfer circuit and converting the same into D.C. energy for return to the input means, and control means, coupled between said second energy transfer circuit and said rectifier means, operable in response to receipt of said control signal to correspondingly regulate the conduction of said rectifier means, whereby the amount of D.C. energy returned from said rectifier means to the input means varies as a function of the decreasing energy requirements of the load circuit.

7. For use with an energy transfer system including a pair of input terminals for receiving energy from a D.C. source, a static inverter coupled to said input terminals for converting D.C. energy into A.C. energy, and a load for dissipating A.C. energy as received in an amount related to the instantaneous load requirements, the improvement which comprises an energy return circuit including transformer means with a common magnetic structure, a first pair of windings disposed adjacent the common magnetic structure and forming a first energy transfer circuit, means for coupling said static inverter to one of said first pair of windings and for coupling the load to the other of said first pair of windings, a second pair of windings disposed adjacent the common magnetic structure and forming a second energy transfer circuit, the disposition of said second energy transfer circuit being such as to provide a control signal which varies as a function of the amount of A.C. energy dissipated in said load, current regulating means having energy input connections coupled to one of said second pair of windings, control input connections, and energy output connections, a control circuit coupled between said one of the second pair of windings and the control input connections of said current regulating means to modulate the level of energy output from the energy output connections of said current regulating means in accordance with said control signal, and controlled rectifier means, coupled to said output connections of the current regulating means, to said input terminals, and to the other of said second pair of windings, operable to rectify A.C. energy received over said other of the second pair of windings and return the rectified energy to said input terminals.

References Cited by the Examiner

UNITED STATES PATENTS

| | | | |
|---|---|---|---|
| 2,437,837 | 3/48 | Saretzky | 321—18 |
| 2,920,259 | 1/60 | Light | 321—2 |
| 2,957,120 | 10/60 | Reuther | 321—18 |
| 3,010,062 | 11/61 | Van Emden | 321—18 |
| 3,015,771 | 1/62 | Mesenhimer | 321—45 X |
| 3,089,075 | 5/63 | Lee | 321—45 |
| 3,089,076 | 5/63 | Lee | 321—45 |

LLOYD McCOLLUM, *Primary Examiner.*

ROBERT L. SIMS, *Examiner.*